United States Patent Office 3,132,566
Patented May 12, 1964

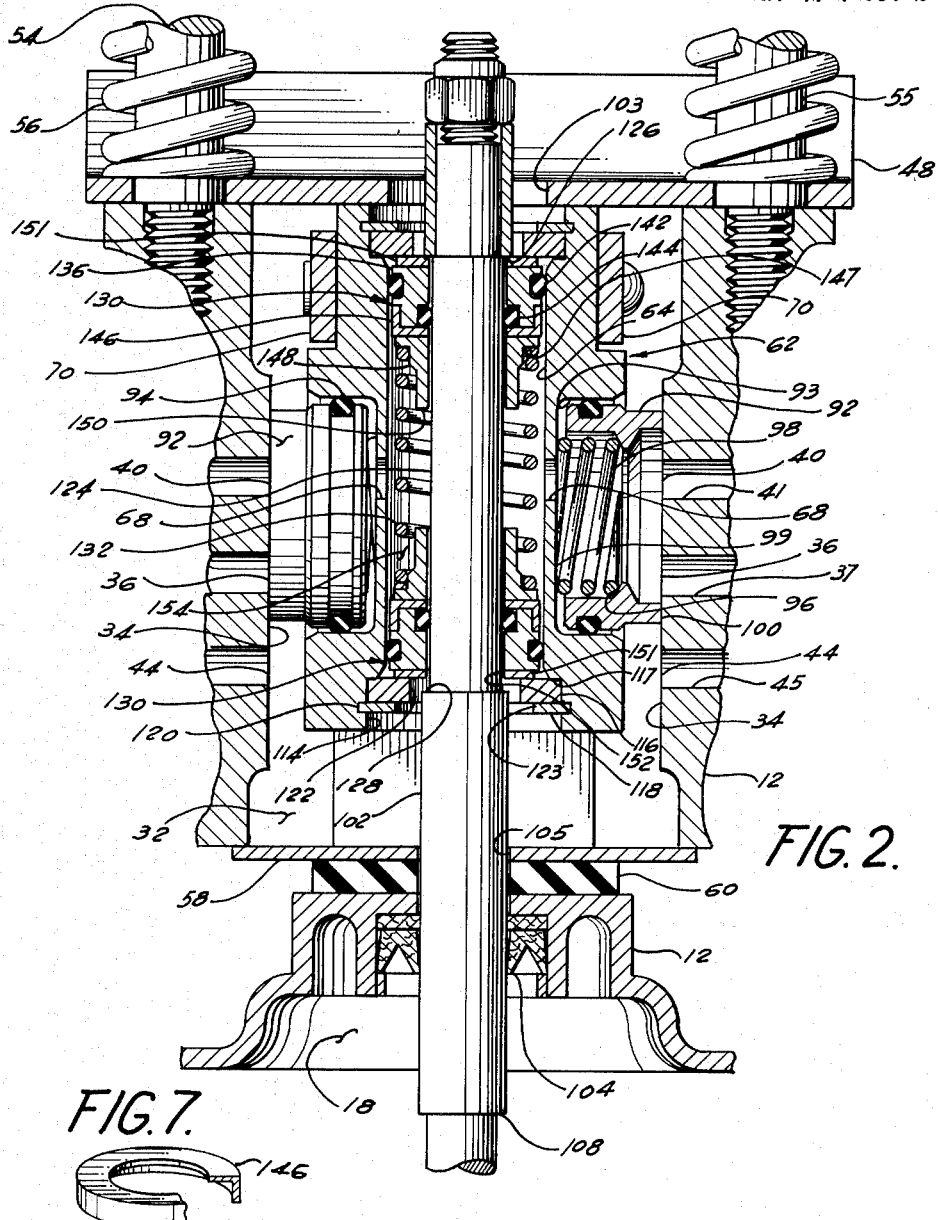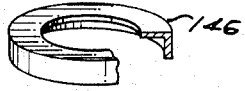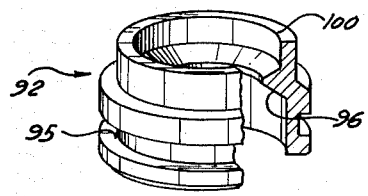

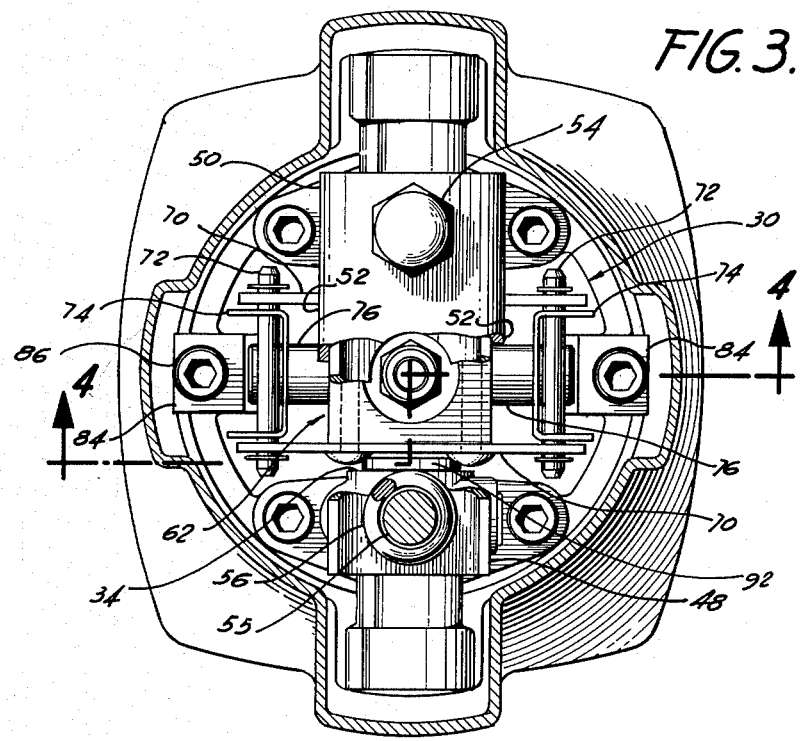
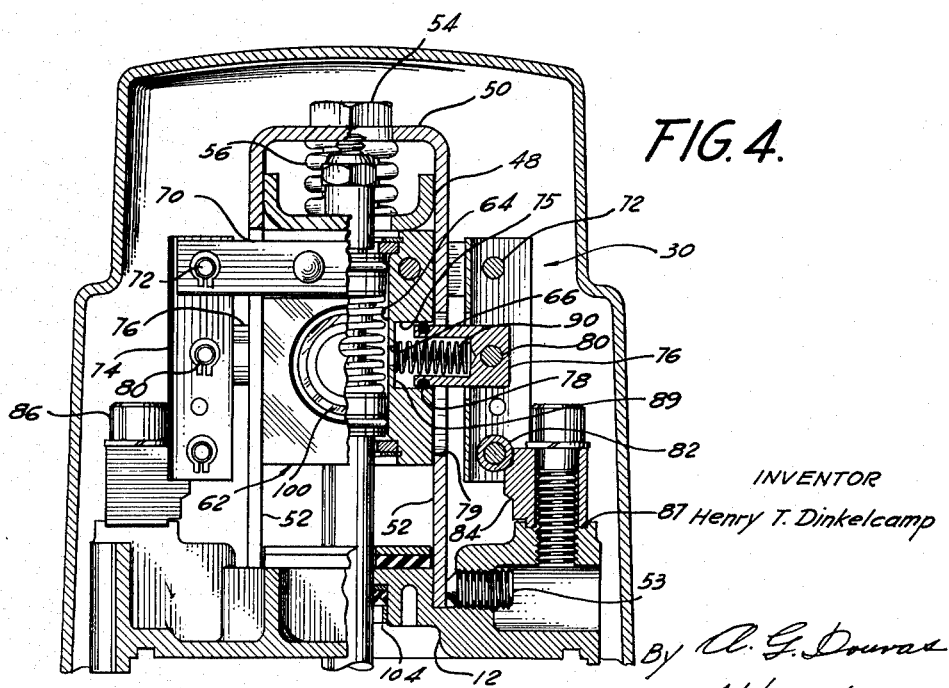

3,132,566
REVERSING VALVE MECHANISM FOR
A FLUID MOTOR
Henry T. Dinkelkamp, Mount Prospect, Ill., assignor to
Stewart-Warner Corporation, Chicago, Ill., a corporation of Virginia
Filed Feb. 2, 1962, Ser. No. 170,558
11 Claims. (Cl. 91—338)

This invention relates to a fluid motor having a reciprocable piston, and more particularly, to a valve mechanism therefor operable to reverse the direction of the piston.

A typical fluid motor of this type includes a piston disposed in a closed-end cylinder to define air chambers within the cylinder on opposite sides of the piston. A valve mechanism alternately directs a source of high pressure air to each of the chambers, while simultaneously exhausting the other of the chambers, operable to reciprocate the piston. An actuating device snaps the valve mechanism between each control position responsive to travel of the piston in the cylinder. A detent device holds the valve mechanism in each control position until the latter is snapped. For dependable, efficient air motor operation, the valve mechanism must shift rapidly, but uniformly, to utilize the full power stroke of the piston.

The conventional reversing valve mechanism includes a valve member having a valve seat seated on a bearing surface defining spaced control ports. The valve seat is generally seated on the bearing surface with a force proportional to the line pressure. The actuating device must have sufficient snap to overcome this friction drag of the seated valve member. Since springs power the typical actuating device with a constant snap, at less than maximum line pressure, this snap is greatly excessive causing damage to the structure. Similarly a spring powered detent device is truly effective only at a single designed inlet line pressure.

Accordingly, an object of this invention is to provide an improved valve mechanism that is actuated between its control positions by a force generally proportional to the inlet line pressure.

Another object of this invention is to provide an improved valve mechanism that is held in each control position by a detent force generally proportional to the inlet line pressure.

These objects will be more fully appreciated after a complete disclosure of the subject invention given in the following specification including the accompanying drawings, wherein:

FIG. 2 is an enlarged longitudinal section view of the reversing valve arrangement as shown in FIG. 1;

FIG. 3 is a top plan view, partly in section and rotated 90°, of FIG. 1;

FIG. 4 is an elevational view, partly in section, as seen from line 4—4 of FIG. 3;

FIG. 5 is a perspective view, partly cut away and in section, of a valve member used in the subject invention;

FIG. 6 is a perspective view of a sealing member used in the subject invention; and FIG. 7 is a perspective view, partly cut away and in section, of a retainer washer used in the subject invention.

Figure 1:
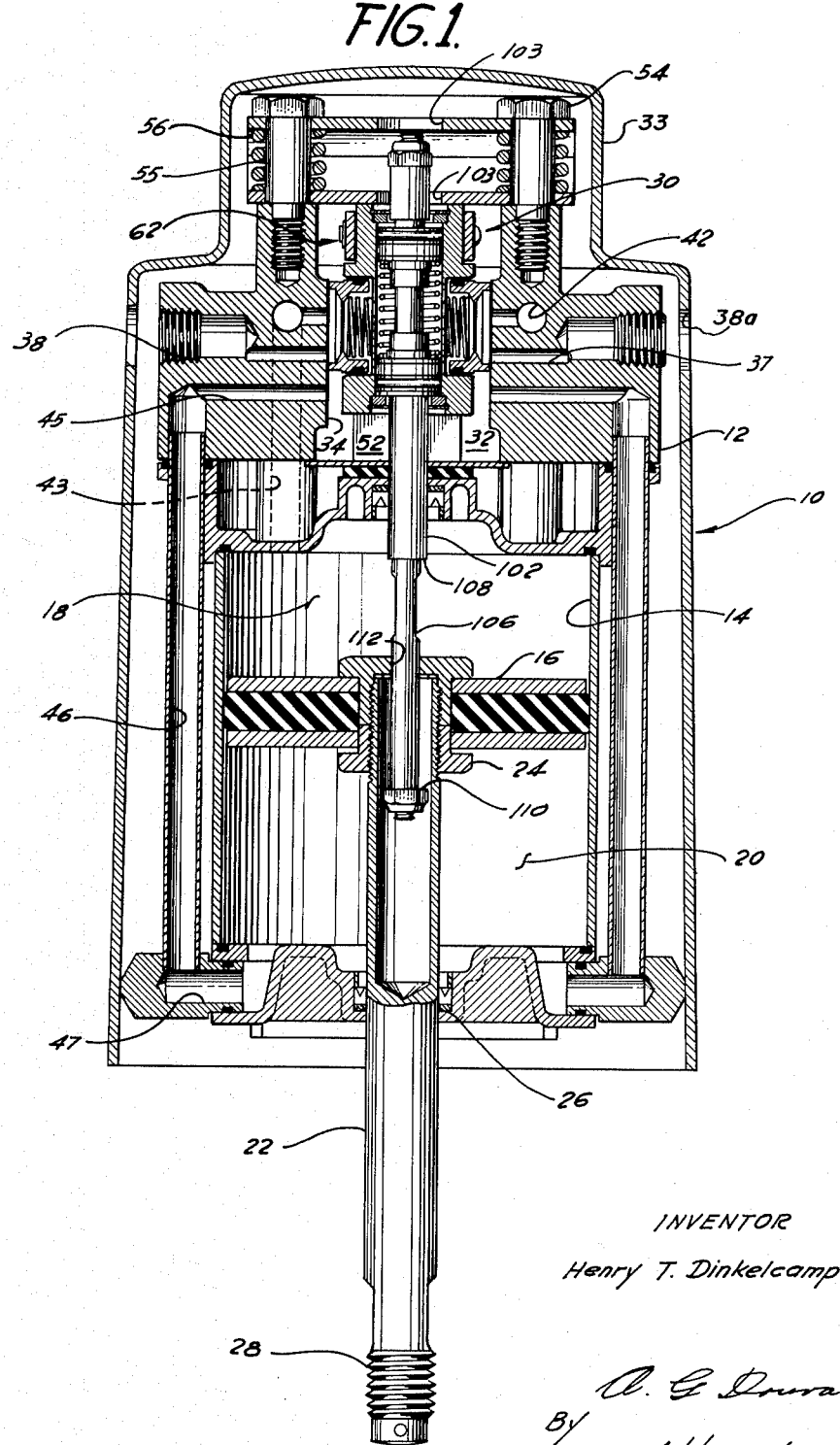
FIG. 1 is a longitudinal section view of an air motor having the subject invention therein.

Referring now to the drawings and particularly to FIG. 1, a typical air motor 10 is shown and includes a housing 12 having an internal cylinder bore 14 with a mating piston 16 disposed therein. The piston 16 separates the cylinder bore 14 into two air-tight chambers 18 and 20. Connecting rod 22 is secured to piston 16 at nut 24 and extends in sealed relationship through packing 26 at the lower end of housing 12. The rod 22 is connected at threaded portion 28 to a device (not shown) which is to be powered by the air motor, as is well known in the art.

The end of the housing 12 remote from the connecting rod 22 defines a cavity 32 that houses the reversing valve mechanism 30 (FIG. 2) for the air motor 10. The cavity 32 is vented between its defining structures such as through opening 38a in cover 33 to the atmosphere.

The cavity 32 is defined in part by opposed flat surfaces 34 having aligned ports terminating thereon. The intermediate port 36 communicates through passage 37 in housing 12 to a threaded tap 38 operable to be connected to a high pressure air source (not shown). The upper port 40 communicates through internal passages 41, 42 and 43 in the housing 12 to the upper chamber 18 of air motor 10. The lower port 44 communicates through passages 45, 46 and 47 in the housing to the lower chamber 20. Any appropriate structure for defining the above passages 37, 41, 42, 43, 45, 46 and 47, is sufficient, the sole requirement being that the ports 36, 40 and 44 terminate on surface 34 and communicate with the upper and lower chambers 18 and 20 and with the intake tap 38, generally as shown.

U-shaped bumper plate 48 (FIGS. 1, 2 and 4) extends across the top of cavity 32 supported by the housing 12. A second U-shaped plate 50 having parallel arms 52 positioned loosely over plate 48 is secured to housing 12. Each of the arms 52 is T-shaped as seen in FIGS. 1 and 2 having its lower end secured by appropriate bolts 53 at the lower end of cavity 32. Shouldered bolts 54 secure the plates 48 and 50 to the housing 12 with interposed compression springs 56 on bolts 54 biasing the plates apart. Plate 48 thus can slide along land 55 of the bolt 54 between the arms 52 against the compression of springs 56. The lower end of cavity 32 is defined by a metal plate 58 supported against the housing 12 by a resilient rubber-type cushion 60.

A shuttle 62 having an axial through-bore 64 is guided by arms 52 (FIG. 4) of U-plate 50 in general alignment with ports 36, 40 and 44 between abutment with the plates 48 and 58. The shuttle 62 includes a pair of transverse aligned openings 66 (FIG. 4, only one of which is shown) and 68 (FIG. 2) intermediate its ends and communicating with bore 64.

A pair of arms 70 (FIGS. 2, 3 and 4) are secured to the top portion of shuttle 62 and are pivotally connected at their ends by pins 72 to a pair of U-shaped levers 74. The arms 70 straddle the lower ends of the arms 52 which thereby position and guide the shuttle 62 sideways and seen in FIGS. 1 and 2. A plunger 76 is received in a larger bore 75 communicating with transverse opening 66 and sealed by O-ring 78 to the periphery of the larger bore. The projected end of plunger 76 extends through slot 79 in arms 52 and is pivoted on pin 80 secured intermediate the ends of lever 74. A roller 82 is rotatably mounted on the lower end of each lever 74 and adapted to engage cam 84 secured by screw 86 and interlocking tongue and groove 87 to the housing 12 at the lower end of the lever 74. A light compression spring 90 between the plunger 76 and shoulder 89 of shuttle 62 biases the plunger outwardly to force the roller 82 against the cam 84.

A hollow valve member 92 (FIGS. 2 and 5) is received in larger bore 93 communicating with the transverse opening 68 and is sealed to the periphery thereof by O-ring 94 in recess 95. The valve member 92 includes an internal annular shoulder 96 abutted on its one side by light compression spring 98 interposed therebetween and shoulder 99 of shuttle 62. Spring 98 biases annular valve seat 100 of valve member 92 into seating relationship against the flat surface 34 of the housing 12. The outer diameter of valve seat 100 is slightly smaller than the internal diameter of larger bore 93 while the inner diameter of valve seat 100 is large enough to cover any two adjacent ports of ports 36, 40 and 44.

Rod 102 (FIGS. 1 and 2) extends through the axial bore 64 of shuttle 62, aligned apertures 103 in the U-shaped plates 48 and 50, and through aligned openings 105 in the plate 58, cushion 60 and housing 12 into the upper chamber 18 of the air motor. Packing 104 around the rod 102 seals the upper chamber 18 from cavity 32 while permitting reciprocation of the rod 102. The rod 102 has a lower portion 106 terminating at spaced opposing shoulders 108 and 110. The lower portion 106 is received within opening 112 of nut 24 and is movable freely axially therein relative to the nut between abutment of shoulders 108 or 110 against the nut. When nut 24 abuts either shoulder 108 or 110, the rods 22 and 102 are united for common continued movement of piston 16 in the same direction.

The shuttle 62 has enlarged bores 114 at the opposite ends of axial bore 64. A washer 116 is received in each bore 114 in abutment with shoulder 117 defined between bores 114 and 64 and held therein by spring washer 118 fitted in recess 120. The washers 116 and 118 have through-openings 122 and 123, respectively, which receive freely the rod 102 extending through axial bore 64 of shuttle 62.

Rod 102 has a portion 124 of uniform diameter terminating at its opposite ends at shoulders 126 and 128. A pair of opposing plungers 130 fit sealingly over uniform diameter portion 124 of rod 102 and within axial bore 64 of shuttle 62. A light compression spring 132 biases the plungers 130 apart and against the washers 116.

The plungers 130 each include an annular sealing member 136 (FIG. 6) having an annular recess 138 on its outer portion and an annular cut 140 on its inner portion. O-ring gaskets 142 and 144 are received within the recess 138 and cut 140 respectively, and sealingly engage the periphery of axial bore 64 and the uniform portion 124 of rod 102. An L-shaped cross-section retainer ring 146 (FIG. 7) is received over cut 140 on sealing member 136 to secure O-ring gasket 144 therein. A T-shaped cross-section annular spacer 148 is biased by spring 132 acting on shoulder 147 against retainer 146. The adjacent surfaces 150 of the spacers 148 are abuttable with each other at certain desired positions, as will be more fully explained hereinafter. Washer 151 separates the member 136 from washer 116 and has a center opening 152 too small for the shoulders 126 or 128 to fit through. Thus washer 151 is confined in outward movement within bore 64 by abutment with washer 116, and is confined in movement relative to rod portion 124 by abutment with shoulders 126 or 128.

The ports 36, 40 and 44 are spaced apart a distance compared to the inside diameter of valve seat 100 so that the valve member 92 in its operating positions interconnects the intermediate port 36 with either outer port 40 or 44. Since intermediate port 36 communicates with tap 38, which is the inlet high pressure air line, the hollow of valve member 92 is always subjected to the line pressure and communicates the line pressure through the appropriate ports 40 or 44 directly to the air chambers 18 and 20 of the air motor.

The shuttle 62 defines, by means of the axial bore 64 sealed at its opposite ends by plungers 130, counter-bored transverse openings 66 and 75 sealed by opposed plungers 76, and the counter-bored transverse openings 66 and 93 sealed by opposed valve member 92, a sealed chamber 154. The fluid pressure within the chamber 154 biases the plungers 76 and 130, and valve members 92 outwardly with a force equal to the pressure acting on the exposed surface area of the respective plunger or member. Plungers 76 provide a detent force for the shuttle 62, while plungers 130 provide a snapping force for the shuttle as will later be fully explained.

To affect the different operating positions, or port connecting positions, of the valve mechanism 30, the entire shuttle 62 is shifted within cavity 32 into abutment with plate 48 or plate 58. FIGS. 1 and 2 show the valve member 92 interconnecting intermediate inlet port 36 with upper port 40 for the upper chamber 18. The shuttle 62 is in direct abutment with plate 48. The inlet air directed to chamber 18 thus forces the piston 16 downwardly, as seen in FIG. 1, within bore 14. The lower chamber 20 is vented through port 44 to cavity 32 which is vented to atmosphere.

The rod 102 is free to move axially of shuttle 62 only a limited amount until the upper shoulder 126 or the lower shoulder 128 engages the respective plunger 130. Referring to FIGS. 1 and 2, downward movement of rod 22 causes nut 24 to abut shoulder 110 to displace the rod 102 downwardly. Downward movement of rod 102, from the position in FIGS. 1 and 2, causes shoulder 126 to engage washer 151 to move the entire upper plunger 130 downwardly within bore 64 relative to shuttle 62. Line pressure in chamber 154 biases plunger 76 (FIG. 4) outwardly and the connected roller 82 against cam 84 to cause a vertical force competent operable to maintain the shuttle 62 against plate 48.

When surfaces 150 of the plungers 130 engage, thereby uniting the plungers 130 together as a solid unit, continued downward movement of rod 102 forces the roller 82 over the restraining high surface of cam 84. After roller 82 clears the high surface of cam 84, the lower plunger 130 restrained only by abutment with shuttle 62 while being subjected on its top side to the full line pressure in chamber 154, snaps the entire shuttle 62 downwardly to the other operative position. The shuttle 62 impacts against plate 58, the cushion 60 absorbing and dissipating a large portion of the impact energy.

The valve member 92, carried by shuttle 62, thereby is shifted from the port communicating position shown in FIG. 2 to a second port communicating position wherein intermediate port 36 is communicated to the lower port 44 thereby directing high pressure inlet air from tap 38 to the lower chamber 20, while the upper chamber 18 is vented through port 40 to cavity 32 and to atmosphere. The direction of piston 16 of the air motor thereby is reversed and biased upwardly relative to FIG. 1.

The transfer of the valve mechanism 30 from its last-mentioned control position in abutment with plate 58, to the position shown in FIGS. 1 and 2, is affected in generally the same manner as that previously described. Upward movement of the piston 16 caused by air pressure in chamber 20 abuts nut 24 with upper shoulder 108. The control rod 102 thereby also is moved upwardly to cause the lower shoulder 128 to abut washer 151. Continued upward movement of the piston 16 and rod 102 causes the surfaces 150 of plungers 130 to abut thereby snapping the roller 82 past the high point of cam 84. The upper unrestrained plunger 130 thereby snaps the shuttle 62 upwardly to the position shown in FIG. 2 to reverse the direction of the piston.

The spacing between abutment of the shoulders 108 and 110 with nut 24, shoulders 126 and 128 with plungers 130, and the plunger surfaces 150 together, depends on design characteristics of the air motor as is well known in the art. It is generally desired, however, that the valve mechanism shift between its control positions operable to reverse the direction of the piston just before the piston strikes the corresponding end of the cylinder.

Valve seat 100 of valve member 92 is biased against surface 34 by forces from spring 98 and from the high pressure air within chamber 154 acting on the valve member. Spring 98 is of light construction sufficient only to overcome the friction of O-ring 94 in bore 93 and to maintain the seat 100 against surface 34 at no line pressure. Thus the major force on member 92 is that caused by the confined fluid pressure. The hollow in the valve member 92 of similar area causes no axial forces from fluid pressure since the opposed pressure forces on the valve member 92 cancel each other.

Since the diameter of bore 93 is slightly larger than the outside diameter of valve seat 100, the area of bore 93, and thus that maximum portion of valve member 92 which is exposed to air pressure within chamber 154, is greater than the maximum area of seat 100. The seating of the valve seat 100 on surface 34 will be along an annular line somewhere intermediate its inner and outer diameters. The area inside the seating line will be subjected to fluid pressure of various magnitudes, while the remaining portion of seat 100 outside of the seating line will be subjected to mechanical seating pressures. The sum of the forces from the fluid and mechanical pressures acting on the respective areas of valve seat 100 equals the line pressure in bore 93 acting on valve member 92.

By proper dimensioning of the differential areas of bore 93 and seat 100, a differential force on valve member 92 seating the valve seat 100 against surface 34 can be established. The differential or seating force will be a force proportional to the line pressure within chamber 154 necessary to ensure proper seating of valve seat 100 on surface 34 to prevent leakage of fluid at the same line pressure. The important factor is that once the proper area relationship is established, the seating force of the valve seat 100 against surface 34, and thus the friction drag, will tend to be proportional to the line pressure and only that required to confine fluid in the valve member.

It is also noted that the transfer of valve mechanism 30, aside from the few minor spring forces required to maintain the parts in snug fit with no line pressure, operates proportionally to the line pressure. The plungers 76 maintain the shuttle 62 and thus the valve member 92 in either of its operating positions by a force proportional to the line pressure acting on the areas of the plungers. Similarly, the actuating force to snap the shuttle 62 and thus the valve member 92 from one position to another is equal to the line pressure acting on the area of plungers 130, the area being defined between axial bore 64 and rod diameter 124. The energy stored within the unrestrained plunger 130 snaps the entire shuttle 62 and thus the valve member 92 to its other operating position.

Thus the subject valve mechanism is particularly adaptable for an air motor of both large and small capacity operable throughout a substantially wide range of inlet line pressures.

The valve mechanism differs from those presently in use since the incoming high pressure air is conveyed directly to the pressurized air motor chamber, while the exhaust air is discharged directly to atmosphere. Since low pressure air requires larger volume than an equal mass of high pressure air, direct exhausting to cavity 32 and not through a valve member of limited size reduces the exhaust back pressure and increases operating deficiencies.

While a specific embodiment of the valve mechanism included in the air motor has been shown, it will be understood to those skilled in the art that various modifications can be made thereto without departing from the scope of the invention. It is thus desired that the invention herein described be not limited by the specific embodiment shown but by the claims hereinafter following.

What is claimed is:

1. In a fluid motor having a closed-end cylinder, a mating piston in said cylinder defining opposed fluid chambers, a bearing surface having thereon spaced ports defining the terminations, respectively, of passages communicating with the fluid chambers, and a high pressure fluid inlet for the motor, the improvement being a valve mechanism for reversing the stroke of the piston, comprising the combination of means guided to move adjacent said bearing surface between spaced operative positions, said guided means having a valve seat engageable with said bearing surface and operable in the respective operative positions of said guided means to enclose separately each chamber port, means for actuating said guided means between said operative positions, said actuating means including opposed plungers movable relative to said guided means until restrained by each other and by said guided means, said plungers being in sealed relationship with the guided means and defining therewith a fluid-tight chamber in the guided means, and means to pressurize said defined fluid-tight chamber with the high pressure fluid.

2. In a fluid motor having a closed-end cylinder, a mating piston in said cylinder defining opposed fluid chambers, a bearing surface having thereon spaced ports defining the terminations, respectively, of passages communicating with the fluid chambers, and a high pressure fluid inlet for the motor, the improvement being a valve mechanism for reversing the stroke of the piston, comprising the combination of means guided to move adjacent said bearing surface between spaced operative positions, said guided means including a valve seat engageable with said bearing surface and operable in the respective operative positions of said guided means to enclose separately each chamber port, detent means operable for retaining said guided means in each operative position, means carried by said guided means for actuating said guided means between said operative positions, said actuating means including opposed plungers movable relative to said guided means until restrained by each other and by said guided means, means including the guided means, the detent means and the actuated means defining a fluid-tight chamber within the guided means and means to pressurize the fluid-tight chamber with the high pressure fluid.

3. In a fluid motor having a closed-end cylinder, a mating piston in said cylinder defining opposed air chambers, a bearing surface having therein spaced ports defining the terminations, respectively, of passages communicating with the air chambers, and a high pressure air inlet for the motor, the improvement being a valve mechanism for reversing the stroke of the piston, comprising the combination of a shuttle member guided to move adjacent the bearing surface to spaced operative positions, said shuttle member having means carried thereby including a valve seat engageable with the bearing surface and operable in the operative positions to enclose separately the chamber ports, detent means for holding said shuttle member in each operative position, said shuttle member having a bore extending in line with the bearing surface, opposed stops on the shuttle member across said bore, opposed plungers in said bore movable toward and away from one another until restrained by each other and by the stops, said bore and opposed plungers defining a fluid-tight chamber, means to communicate said last-mentioned chamber with said fluid inlet, and means to move said plungers responsive to movement of the piston.

4. In an air motor having a closed-end cylinder, a mating piston in said cylinder defining opposed air chambers, a bearing surface having therein spaced ports defining the terminations, respectively, of passages communicating with the air chambers, and a high pressure air inlet for the motor, the improvement being a valve mechanism for reversing the stroke of the piston, comprising the combination of a shuttle member guided to move adjacent the bearing surface between spaced operative positions, means carried by said shuttle member defining a valve seat engageable with the bearing surface and operable in the operative positions to enclose separately the chamber ports, said shuttle member having a through-bore extending in line with said bearing surface, opposed stops across said through-bore, opposed plungers in said through-bore movable toward and away from one another until restrained, respectively, by each other and by the stops, said through-bore defining along with the opposed plungers a fluid-tight chamber, means to communicate said last-mentioned chamber with said air inlet, and means extending within the through-bore to move said plungers responsive to movement of the piston.

5. In an air motor having a closed-end cylinder, a mating piston in said cylinder defining opposed air chambers, a bearing surface having therein spaced ports defining the terminations, respectively, of passages communicating with the air chambers, and a high pressure air inlet for the motor, the improvement being a valve mechanism for reversing the stroke of the piston, comprising the combination of a shuttle member guided to move generally in alignment with said ports adjacent the bearing surface between spaced operative positions, means carried by said shuttle member defining a valve seat, said valve seat being engageable with the bearing surface and being operable in respective operative positions to enclose separately the chamber ports, detent means for holding said shuttle member in each operative position, said detent means including a plunger carried in sealed relationship in a bore in said shuttle member, actuating means for shifting said shuttle means between the operative positions, said actuating means including opposed plungers carried in sealed relationship in a bore in said shuttle member and movable toward and away from one another until restrained by each other and by the shuttle member, means to communicate the bores of said detent means and said actuating means with said air inlet, and means to move said opposed plungers separately responsive to movement of the piston.

6. In an air motor having a closed-end cylinder, a mating piston in said cylinder defining opposed air chambers, a bearing surface having therein spaced ports defining the termination, respectively, of passages communicating with the air chambers, and a high pressure air inlet for the motor, the improvement being a valve mechanism for reversing the stroke of the piston, comprising the combination of said bearing surface having a port thereon for the air inlet, a shuttle member guided to move axially along the bearing surface between spaced operative positions, said shuttle member having a bore open to said surface, a tubular valve member disposed in said bore in axially movable sealing relationship with the periphery thereof, said valve member having at its end adjacent the bearing surface a valve seat of exterior area differentially smaller than the area of said bore, said valve seat abutting said bearing surface and being operable to enclose the inlet port separately with each of the chamber ports in the operative positions of the shuttle member, said shuttle member having an axial through-bore communicating with said bore, opposed stops on the shuttle member across said through-bore, opposed plungers in said through-bore in sealing relationship with the periphery thereof, said opposed plungers being movable toward and away from one another until being restrained by each other and the adjacent shuttle member stop, said bore and valve member and said through-bore and opposed plungers defining together a fluid-tight chamber communicating through said valve member with said air inlet port, and means extending within the through-bore to move separately the opposed plungers responsive to movement of the piston.

7. In an air motor having a closed-end cylinder, a mating piston in said cylinder defining opposed air chambers, a bearing surface having therein spaced ports defining the termination, respectively, of passages communicating with the air chambers, and a high pressure air inlet for the motor, the improvement being a valve mechanism for reversing the stroke of the piston, comprising the combination of a shuttle member guided to reciprocate axially along a path generally in alignment with said ports between two spaced operative positions, means carried by said shuttle member defining a valve seat, said valve seat being operable to enclose separately each of the chamber ports in the operative positions of the shuttle member, said shuttle member having a bore transverse to its path of movement, a plunger in said bore in sealing relationship with the periphery thereof, detent structure for holding said shuttle member in each operative position, said plunger being operatively connected to said detent structure for actuation thereof, said shuttle member also having an axial bore in line with its path of movement and communicating with said transverse bore, opposed plungers in said axial bore in sealing relationship with the periphery thereof, said opposed plungers being movable toward and away from one another until restrained respectively, by each other and by the shuttle member, said transverse and axial bores and respectively, said plunger defining together and opposed plungers a fluid-tight chamber, means to communicate said air inlet with said last-mentioned chamber, and means responsive to movement of the piston to move separately the opposed plungers.

8. In an air motor having a closed-end cylinder, a mating piston in said cylinder defining opposed air chambers, a bearing surface having therein spaced ports defining the termination, respectively, of passages communicating with the air chambers, and a high pressure air source for the motor, the improvement being a valve mechanism for reversing the stroke of the piston, comprising the combination of said bearing surface having a port for the air source disposed intermediate said chamber communicating ports, a shuttle member guided to reciprocate axially along a path generally in alignment with said ports between spaced operative positions, said shuttle member having a bore open to said surface, a tubular valve member disposed in said bore in axially movable sealing relationship with the periphery thereof, said valve member having a valve seat engageable with the bearing surface and of exterior area differentially smaller than the area of said bore, said valve member being operable in the operative positions of the shuttle member to intercommunicate the inlet port separately with the chamber ports, said shuttle member also having a bore transverse to its path and communicating with said first-mentioned bore, a plunger disposed in said transverse bore in sealing relationship with the periphery thereof, detent structure for holding said shuttle member in each operative position, said plunger being operatively connected to said detent structure for actuation thereof, said shuttle member also having a through-bore in line with its path and communicating with said other bores, opposed plungers in said through-bore in sealing relationship with the periphery thereof, said opposed plungers being movable toward and away from one another until restrained, respectively, by each other and by the shuttle member, said bores and through-bore and respectively, said valve member, plunger and opposed plungers defining together a fluid-tight chamber communicating through said valve member with the inlet port, and means extending through the through-bore to move the opposed plungers separately responsive to movement of the piston.

9. A valve mechanism, comprising the combination of a bearing surface having thereon at least two spaced ports, means guided adjacent said bearing surface between spaced operative positions, said guided means defining a valve seat engageable with said bearing surface and operable in the operative positions of the guided means, respectively, to enclose separately the ports, means for shifting said guided means to the operative positions, said shifting means including opposed plungers matable in a bore and movable toward and away from one another until restrained by one another and the guided means, means including a high pressure fluid supply to pressurize the opposed plungers to bias them apart against the guided means, and means to actuate the plungers separately.

10. A valve mechanism, comprising the combination of a bearing surface having thereon at least two spaced ports, means guided adjacent said bearing surface between spaced operative positions, means carried by the guided means defining a valve seat engageable with said bearing surface, said valve seat being operable in the operative positions of the guided means, respectively, to enclose separately the ports, detent means for detaining said guided means in each operative position, actuating means for shifting said guided means to the operative positions, said actuating means including opposed plungers movable toward and away from one another until restrained by one another and the guided means, and means including a high pressure fluid supply to pressurize the opposed plungers to bias them apart against the guided means and to actuate said detent means.

11. A valve mechanism, comprising the combination of a bearing surface having therein spaced ports communicating with a fluid chamber and with a high pressure fluid supply therefor, a shuttle member guided generally in line with the spaced ports between spaced operative positions, said shuttle member having a bore open to said surface, a tubular valve member sealingly received in said bore and having a valve seat engageable with said bearing surface of differentially smaller exterior area than the area of the bore, said valve seat being operable to enclose the supply port and in the operative positions, respectively, to intercommunicate and to separate, the supply port and the chamber port, and pressure responsive means carried by the shuttle member and communicating with the pressure of the fluid supply operable to shift the shuttle member between the operative positions.

References Cited in the file of this patent

UNITED STATES PATENTS

| | | |
|---|---|---|
| 2,057,364 | Bystricky | Oct. 13, 1936 |
| 2,448,459 | Palm | Aug. 31, 1948 |
| 2,637,304 | Dinkelkamp | May 5, 1953 |
| 2,707,456 | Schweisthal | May 3, 1955 |
| 2,751,891 | Mohler | June 26, 1956 |